United States Patent
Jin et al.

(10) Patent No.: US 9,870,122 B2
(45) Date of Patent: Jan. 16, 2018

(54) GRAPHICAL USER INTERFACE FOR REARRANGING ICONS

(71) Applicant: International Business Machines Corporation, Armonk, NY (US)

(72) Inventors: Yuan Jin, Shanghai (CN); Xiao Xia Mao, Shanghai (CN); Jian Jun Wang, Xi'an (CN); Qi Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 14/719,382

(22) Filed: May 22, 2015

(65) Prior Publication Data
US 2016/0342305 A1  Nov. 24, 2016

(51) Int. Cl.
*G06F 3/048* (2013.01)
*G06F 3/0481* (2013.01)
*G06F 3/0483* (2013.01)

(52) U.S. Cl.
CPC ........ *G06F 3/04817* (2013.01); *G06F 3/0483* (2013.01)

(58) Field of Classification Search
CPC .................................................. G06F 3/04817
See application file for complete search history.

(56) References Cited

U.S. PATENT DOCUMENTS

| 6,097,391 A | 8/2000 | Wilcox | |
|---|---|---|---|
| 6,915,490 B1 | 7/2005 | Ewing | |
| 8,856,648 B2 | 10/2014 | Yang et al. | |
| 2008/0320391 A1* | 12/2008 | Lemay | G06F 3/04886 715/702 |
| 2009/0113336 A1* | 4/2009 | Reifman | H04M 1/72583 715/781 |
| 2012/0278745 A1 | 11/2012 | Kim et al. | |
| 2014/0013254 A1 | 1/2014 | Hosein | |
| 2014/0068477 A1 | 3/2014 | Roh | |

FOREIGN PATENT DOCUMENTS

CA        2327323 A1    6/2001

OTHER PUBLICATIONS

Costello, Sam; "Rearranging iPhone Home Screen Icons"; About.com; Printed Mar. 4, 2015; pp. 1-4; <http://ipod.about.com/od/iphonehowtos/a/iph_home_screen.htm>.
Mayankj; "How to Create a Copy & Paste Icon"; eHow; Provided by Searcher Dec. 4, 2014; pp. 1-3; Demand Media, Inc.; <http://www.ehow.com/how_8058477_create-copy-paste-icon.html>.

* cited by examiner

*Primary Examiner* — Peiyong Weng
(74) *Attorney, Agent, or Firm* — Walter L. Rudberg; A. Imtiaz Billah

(57) ABSTRACT

Embodiments of the present invention provide a method and system for moving one or more icons on an electronic device. The method includes, receiving a selection of at least one icon and moving the selected icon(s) to a queue. The selected icon(s) are moved from the queue to a target location, upon an indication of the target location. The target location is made up of at least a target page and a position on the target page.

17 Claims, 6 Drawing Sheets

GRAPHICAL USER INTERFACE FOR REARRANGING ICONS

BACKGROUND OF THE INVENTION

The present invention relates generally to the field of graphical user interfaces, and in particular to an intuitive user interface for rearranging and moving icons between pages of an electronic device.

Electronic devices such as cellular phones, smart phones, mobile phones, Wi-Fi phones, laptop computers, tablet computers, netbooks, handheld computers, personal organizers, e-reading devices, gaming devices and the like, may provide a graphical user interface (GUI) that allows users to easily interact with the various functionalities of the electronic device. Touch screens based on GUI have recently been applied to all sorts of electronic devices. If a user touches a text, a graphic, or an icon displayed on the touch screen with his finger, the electronic device may detect the user's selection based on the location, situation, and type of touch.

SUMMARY

According to one embodiment of the present invention, a method for moving one or more icons is provided, the method comprising: receiving, by one or more processors, a selection of at least one icon from a plurality of icons; moving, by the one or more processors, the selection of the at least one icon to a queue; and moving the selection of the at least one icon from the queue to a target location, wherein the target location comprises: a target page and a position on said target page.

Another embodiment of the present invention provides a computer program product for moving one or more icons, based on the method described above.

Another embodiment of the present invention provides a computer system for moving one or more icons, based on the method described above.

DETAILED DESCRIPTION

Figure 1:
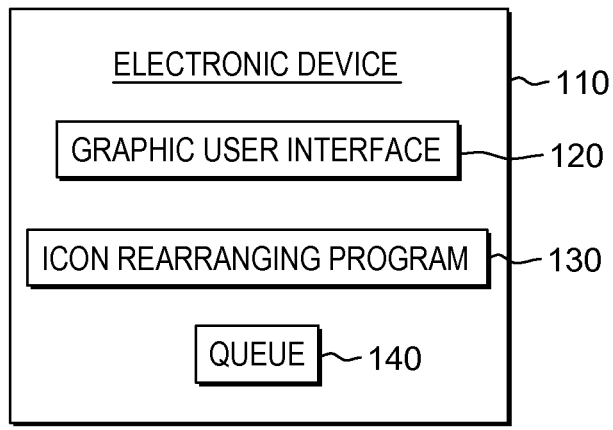
FIG. 1 is a functional block diagram illustrating an electronic device, in accordance with an embodiment of the present invention.

The embodiments of the present invention will be described in the context of electronic devices and user interfaces. Electronic devices, such as mobile phones, tablet computers, laptop computers, personal computers, e-readers, or any other electronic devices having a graphical user interface (GUI) allow a user to interact with the device through various input/output (I/O) interfaces.

Generally, an I/O is a mechanism by which a user interacts with an electronic device. The GUI of an electronic device is capable of representing information from the electronic device to the user. Specifically, the GUI depicts a user interface (e.g., icons). Additionally, the GUI, for example, can include a traditional display screen or a touch screen.

Electronic devices will commonly utilize a sensory input device wherein the user, through various sensory oriented means, controls the electronic device. Sensory input devices convert a physical act by the user to an analog or digital command to the electronic device, thereby allowing a user to interact and instruct the electronic device. For example, a sensory input device can include a mouse, a keyboard, a microphone, a touchpad and a touchscreen, etc.

Touchscreens or touch sensitive displays, provides I/O interface between the device and a user. Such a configuration permits the display screen to function as both input and output device. The touch screen may be configured to detect a touch input pressure, touch input position, as well as a touch input area, etc. In an exemplary embodiment, a point of contact between touch screen and the user corresponds to a finger of the user.

A touch sensitive display allows users to interact with the device through various types of touch gestures. In some embodiments, the user interacts with the GUI primarily though a stylus contact on the touch sensitive surface. In other embodiments, the user interacts with the GUI primarily though finger contacts and gestures on the touch sensitive surface. It is appreciated that many types of gestures are possible. Examples of touch gestures include, but are not limited to: a tap gesture, a drag gesture, a swipe gesture, a hold gesture, etc. A tap gesture consists of a singular tap at a specific, single contact point on the GUI. A drag gesture consists of an initial contact at a specific location, and holding while sliding the contact point to an end contact point. Similarly, a swipe gesture consists of an initial contact and a quick holding while performing a sliding motion across the GUI in a specific direction. A hold gesture consists of maintaining contact with a contact point for period of time.

The GUI may display many different icons to the user. An icon is a small picture or image that represents an object or program. Examples of icon types include, but are not limited to: program icons, status icons, media icons, and folder icons. Program icons (also referred to as applications) allow a user to select and execute an application or functionality on the electronic device. For example, such applications and functionalities include opening a web browser, starting an email client application, initiating a game, or other types of functionalities. Status icons portray internal statuses of the electronic device. Media icons provide user access to various media assets contained within an electronic device, such as photographs, videos, or audio files. Folder icons are a digital representation of a folder which hold program icons within it. Folder icons are a means to combine icons in a singular location, for example, storing similar applications together.

Regardless of what type of icons are represented on the GUI, the icons may be portrayed on one or more pages. Each page provides a convenient way for displaying all sorts of icons on an electronic device. The GUI may employ a number of pages for grouping and displaying icons. The GUI may display one page at a time. Icons that are displayed can be arranged on a page, in a grid, or any other configuration. Pages between one electronic device and another may not always be identical, as the arrangement of icons may be based on user preferences. A user may navigate between the different pages using a touch gesture, such as a swipe gesture, across the touch screen. When multiple pages are present, the GUI may include a page indicator for indicating which of the pages is currently displayed, as well as the total number of pages in the GUI. The page indicator is capable of comprising a plurality of different graphical representations.

The present invention will now be described in detail with reference to the Figures. FIG. 1 is a functional block diagram illustrating an electronic device, generally designated 110, in accordance with one embodiment of the present invention. FIG. 1 provides only an illustration of one implementation, and does not imply any limitations with regard to the environments in which different embodiments may be implemented. Modifications to electronic device 110 may be made by those skilled in the art without departing from the scope of the invention as recited by the claims. While FIG. 1 shows electronic device 110 having various components, it is understood that implementing all of the illustrated components is not a requirement. Greater or fewer components may alternatively be implemented.

Electronic device 110 includes graphical user interface (GUI) 120, icon rearranging program 130, and queue 140. Electronic device 110 may be a mobile phone, a tablet computer, a laptop computer, a personal computer, an e-reader, or any other programmable electronic device capable of executing computer readable program instructions.

GUI 120 is the means by which a user interacts with electronic device 110. GUI 120 is capable of receiving data, user commands, and data input modifications from a user. GUI 120 is also capable of communicating with icon rearranging program 130. In other embodiments, GUI 120 may be integrated with icon rearranging program 130.

In an exemplary embodiment, GUI 120 may be any type of UI. A GUI utilizes graphical elements depicting information to the user. In some embodiments, GUI 120 displays a plurality of selectable user interface objects (i.e., folders, icons or application icons, etc.). In some embodiments, the selectable user interface objects may be part of a plurality of page sets, wherein each page contains a different plurality of selectable user interface objects.

Icon rearranging program 130 may be initiated by any known means in the art. Upon activating icon rearranging program 130, electronic device 110 enters icon rearranging mode. For example, icon rearranging program 130, may detect a user input that corresponds to a request to activate icon rearranging program 130 thereby electronic device 110 enters icon rearranging mode. Once icon rearranging mode is initiated, a user is able to select each icon and/or folder on the display to be moved to a target page. The target page is the page to which the user desires to move all selected icons and folders. Icon rearranging program 130 allows a user to move icons on the GUI of electronic device 110. Icon rearranging program 130 allows a user to select one or more icons on the GUI display. The selection of icons can be performed using any known means in the art. Upon selection of each icon, the icon is moved into queue 140. All selected icons remain in the queue 140 until the user selects a desired target page to move the icons and folders to.

Queue 140 holds all selected icons when a user is in icon rearranging mode. Specifically, queue 140 is a queue in which selected icons from icon rearranging program 130 are placed, until the user selects the desired target page to move the icons and folders to. Upon the user selecting the target page, all icons and folders in queue 140 are removed from queue 140 and moved to target page.

Figure 2:
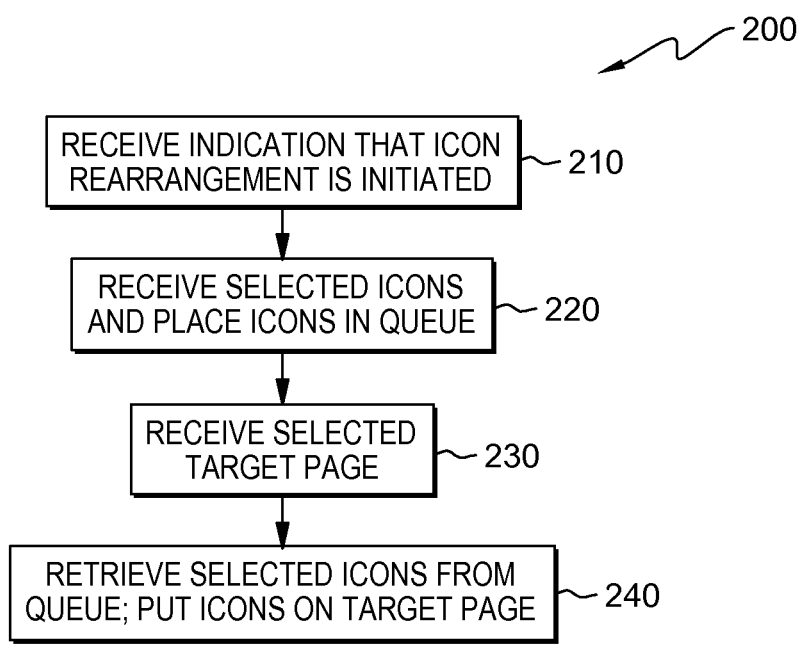
FIG. 2 is a flowchart depicting operational steps of an intuitive graphical user interface for rearranging and moving one or more icons, in accordance with an embodiment of the present invention.

Reference is now made to FIG. 2. FIG. 2 is flowchart 200 depicting operational steps of icon rearranging program 130 for moving one or more icons and/or folders on an electronic device 110, in accordance with an embodiment of the present invention.

In step 210, icon rearranging program 130 receives an indication that an icon rearrangement mode is initiated by a user. Prior to initiating step 210, electronic device 110 is in its normal operation mode. For example, in normal operating mode, selecting one of the application icons will activate and launch the selected application. In another example, when electronic device 110 is in its normal operation mode, selecting one of the folders opens the folder which may contain a group of at least one application icons. Upon electronic device 110 receiving an indication from a user, electronic device 110 enters icon rearranging mode. The icon rearrangement mode may be initiated in any way known in the art, including for example, a touch gesture, such as tapping on an icon, tapping and holding an icon for drag gesture, or making a selection through a menu.

Upon initiating icon rearranging program 130, icon rearrangement mode can be portrayed by numerous other methods, including but not limited to other visual, auditory, haptic indications. For example, other visional indications include: icons could shake in their given area, icons becoming semi-transparent, etc. Other examples include the device making certain auditory sounds, or even specific vibration haptic feedback to a user. In some embodiments, upon initiating an icon rearranging mode, all icons and folders on the display superimpose a graphical symbol (e.g., a pair of scissors) over the icon and/or folder graphic. For exemplary purposes, a graphic of a scissor (see scissor graphic 343 on FIG. 3B), superimposed over an icon is used to portray when electronic device 310 is in icon rearranging mode. The symbol superimposed over the icons/folder graphic is the activation region for selecting each icon/folder.

In step 220, icon rearranging program 130 receives the selected icons, as well as folders, and places the items in queue 140. In the exemplary embodiment, upon the user selecting the symbol superimposed over the icons graphic, the icon is moved to queue 140 of electronic device 110.

Once in icon rearrangement mode, a user can move icons and/or folders within the same page or across multiple pages to the queue 140. In this exemplary embodiment, upon receiving the selection of each icon and/or folders, the selected icon(s) and/or folders are removed from GUI 120 and placed in queue 140. Queue 140 allows the user to select as many icons as the user desires on any page on the electronic device to be moved. For example, the user can select multiple icons on a single page to be moved or the user can select a single icon on a single page to be moved.

Each selected icon is placed in queue 140. In this exemplary embodiment, only the selected application icon is moved to queue 140; the program itself represented by the application icon remains where it is stored on electronic device 110. In an exemplary embodiment, the queue does not contain a limit as to the number of icons it can hold.

In step 230, icon rearranging program 130 receives a selected target page for the selected icons. In this exemplary embodiment, when the user finishes selecting all desired icons to be moved to a new page, the user finds the desired page in electronic device 110, in which the user desires to move all queued icons, hereinafter referred to as the target page. In an exemplary embodiment, in order for the user to place the icons to a new page, the user switches from the current page to the target page which is where the user desired to move the icons and/or folders to. In one embodiment, the target page may be a blank page which the user wishes to populate with the selected icons. In other embodiments, the target page may already contain one or more icons before placing the selected icons.

In step 240, icon rearranging program 130 retrieves the selected icons from queue 140 and moves the icons to a user specified location on the target page. In an exemplary embodiment, upon input from a user, the icons queued in queue 140 are removed from the queue and moved to the target page. Upon moving the icons, the icons may propagate around the user's inputted location. In another embodiment, upon moving the icons, the icons may propagate starting at the user's inputted location. Additionally, upon moving the icons, the icon rearrangement mode is automatically terminated. In an exemplary embodiment, the user through a touch screen, touches the exact position the user wishes to propagate all icons from queue 140. All icons previously selected arrange in a grid pattern originating at the location the user selected on the target page. Similarly, if the GUI is not a touch screen, through user input, the icons will arrange in a grid pattern around the location the user selected on the target page. If more icons are queued than space on the target page, then the icons that were selected last will 'overflow' and be moved to an additionally created page, until there are no additional icons in the queue.

In an exemplary embodiment, icon rearranging program 130 may be customizable in how it propagates icons from queue 140 to the specified location on the target page. Icons may be moved in a certain order for example, alphabetical order, chronological order of their selection, frequency of use by the user, the alternative of the aforementioned examples, or any user defined order, etc.

It is appreciated by those skilled in the art that there are numerous ways user can define the order icons are moved from queue to target page. In an exemplary embodiment, the selected icons are moved from queue 140. In one embodiment, the first selected icon added to queue 140 is the first icon removed from queue 140 and placed on the GUI display page selected by the user, and the remaining icons are subsequently removed from queue 140 and added to the display page until no icons remain in queue 140. In another embodiment, the last selected icon added to queue 140 is the first icon removed from queue 140 and placed on the GUI display page selected by user, and the remaining icons are subsequently removed from queue 140 and added to the display page until no icons remain in queue 140. In another exemplary embodiment, the icons are propagated in alphabetical order, regardless of the order the user selected them in.

Accordingly, by performing the operational steps of FIG. 2, icon rearranging program 130 allows a user to easily move one or more icons at one time from one page to another page on electronic device 110.

FIGS. 3A-D are an example user interface depicting the selection of icons and placing the icons on a target page, in accordance with an embodiment of the present invention.

Figure 3A:
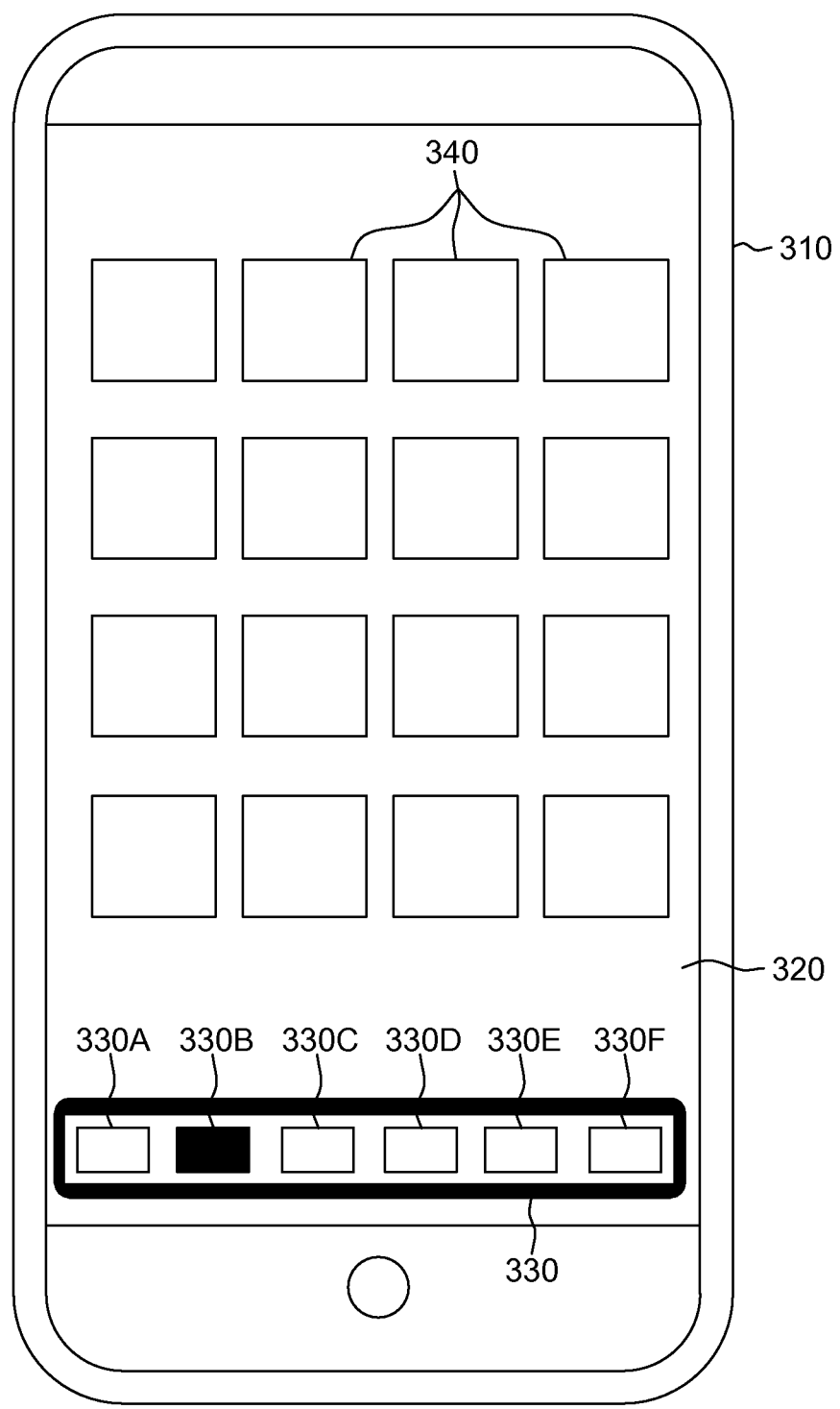
FIGS. 3A-D are an example user interface depicting the selection of icons and placing the icons on a target page, in accordance with an embodiment of the present invention.

FIG. 3A depicts electronic device 310. Electronic device 310 includes a touch sensitive display (touch screen) 320. It should be understood, however, that electronic device 310 may include one or more additional physical user-interface devices, such as a one or more physical buttons, a keyboard, a mouse, and joystick, etc. Similarly, it should be understood that display 320 on electronic device 310 may be a non-touch sensitive screen.

Electronic device 310 depicts a plurality of icons 340. Icons 340 may be folders, icons or a combination of icons and folders. In this exemplary embodiment page indicator row 330 depicts the multiple pages on electronic device 310. Page indicator row 330 portrays all pages associated with electronic device 310. In other embodiments (not shown) electronic device 310 may only have one page of icons, thereby eliminating the need for a page indicator row 330. In the exemplary embodiment page indicator row 330 contains page indicators 330A-F. Page indicators 330A, 330B, 330C, 330D, 330E, and 330F each represent a separate page containing icons and folders. The six page indicators (i.e., 330A-F) represent a separate consecutive page. Page indicators 330A-F indicate the number of pages on electronic device 310, as well as, which of the pages is currently displayed on the display 320. For example, page indicator 330B is selected wherein display 320 displays only the icons and folders contained within the page associated with page indicator 330B. Likewise, when page indicator 330C is selected display 320 displays only the icons and folders contained within the page associated with page indicator 330C.

Figure 3B:
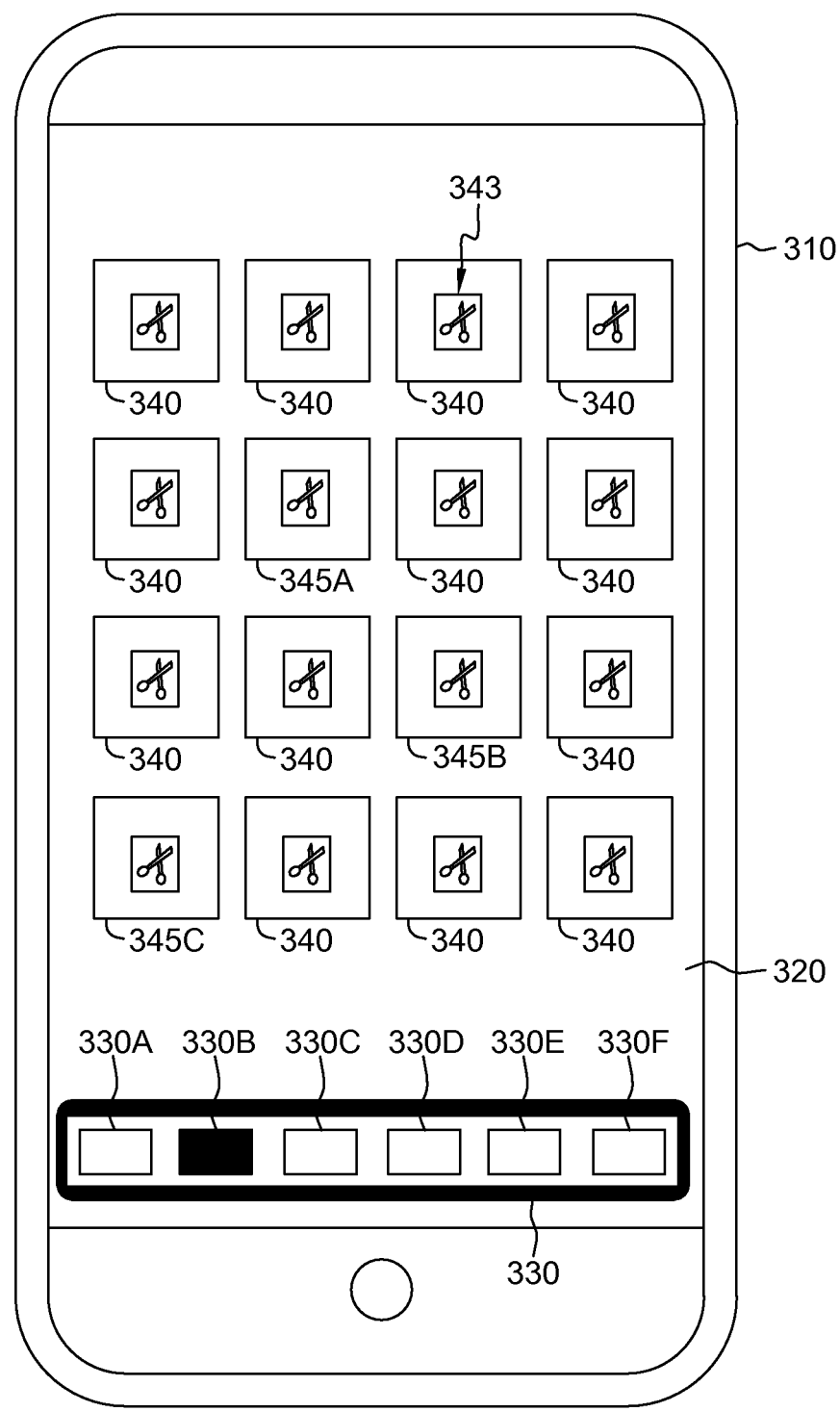

FIG. 3B depicts electronic device 310 in icon rearrangement mode. Electronic device 310 enters icon rearrangement mode upon detection of a request to enter icon rearrangement mode (i.e., step 210 of FIG. 2). Icon rearrangement mode allows the user to rearrange the location of icon(s) 340 throughout the plurality of pages associated with page indicators 330A-F of electronic device 310.

In some embodiments, the icons and folders display a visual indication to the user that electronic device 310 is in the icon rearrangement mode. For example, icons 340 of electronic device 310 could change their appearance. In this exemplary embodiment, icons 340 are superimposed with a graphic 343 of a scissor, portraying to the user that electronic device 310 is in the icon rearrangement mode. In other embodiments, any other graphic or identifying notation to the user can be used to indicate that the device is in the icon rearrangement mode.

When the device detects a request to move an icon to the queue, the icon is removed from display 320, and placed in queue 140. In the exemplary embodiment, an icon is moved to queue 140 upon the user selecting the superimposed graphic 343 of a scissor, through any known means in the art.

In the exemplary embodiment, the user selects the scissor graphic 343 on touch sensitive display 320 through touching the scissor graphic. Specifically, the selection includes a contact with the touch sensitive display 320, at a location corresponding to the displayed scissor graphic 343 superimposed over the icon. The contact is performed by any means known in the art, wherein electronic device 310 detects that the scissor graphic 343 is selected. In some embodiments, electronic device 310 indicates that the scissor graphic 343 is selected through any known means in the art, for example, auditory feedback, haptic feedback, or visual feedback.

Electronic device 310 removes any selected icon(s) 340 from display 320 and moves icons 340 into queue 140. In this exemplary embodiment, icons 345A-C are selected by the user. Icons 345A-C and icons 340 are of similar nature however icons 345A-C are uniquely identified to highlight the fact that in the exemplary embodiment, only icons 345A-C are selected by the user.

Figure 3C:
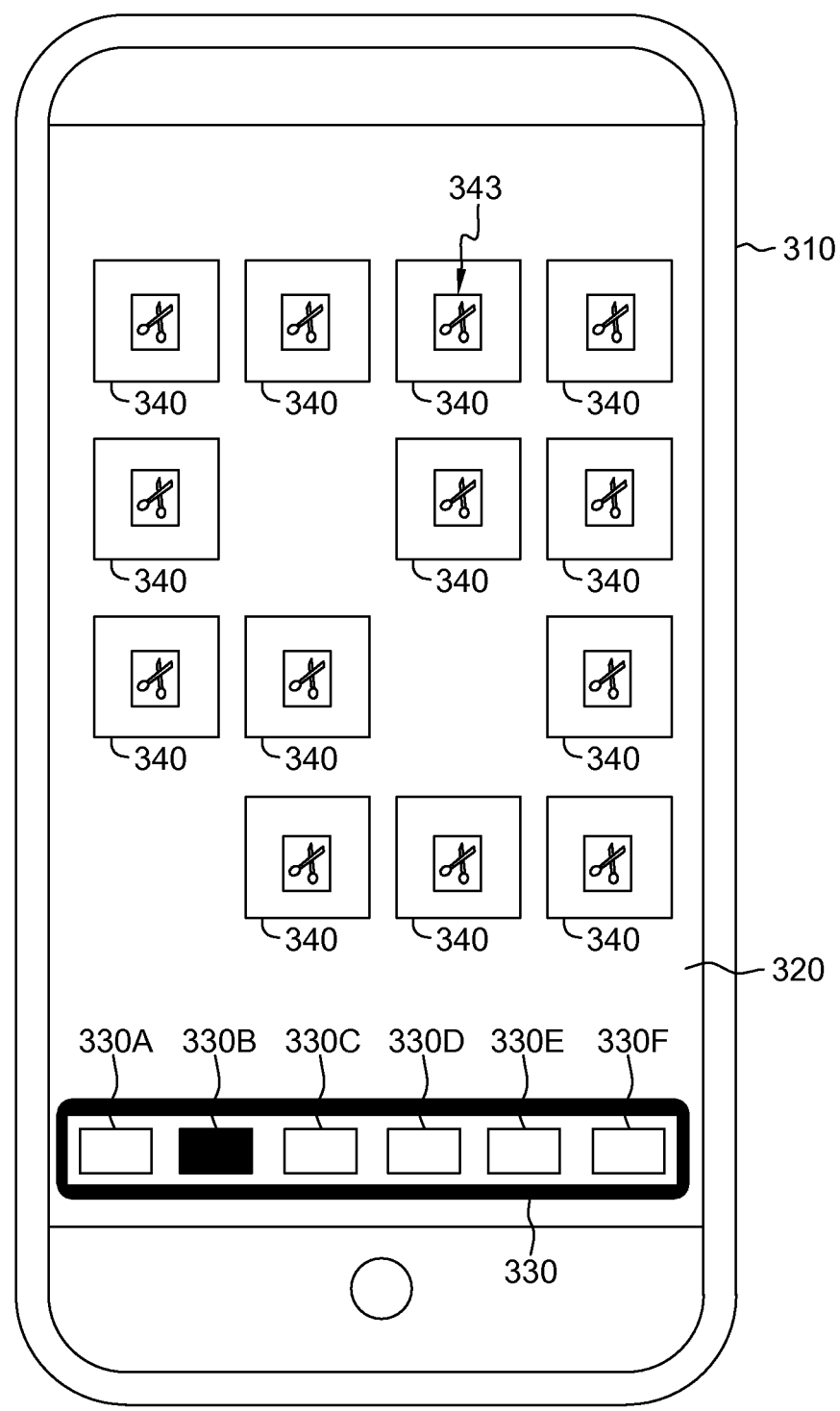

FIG. 3C depicts electronic device 310 after the selection of three icons, while in icon rearrangement mode. Specifically, icons 345A-C (as displayed on FIG. 3B) were selected and have been removed from display 320, and are in queue 140 (i.e., step 220 of FIG. 2). Upon selection of each icon, icons 345A-C are removed from display 320 and moved to queue 140. Icons 340 (i.e., unselected icons) remain depicted on display 320. After each selection, electronic device 310 remains in icon rearrangement mode allowing the user to either continue selecting additional icons or switch pages via page indicator row 330 and select additional icons on a different page.

Figure 3D:
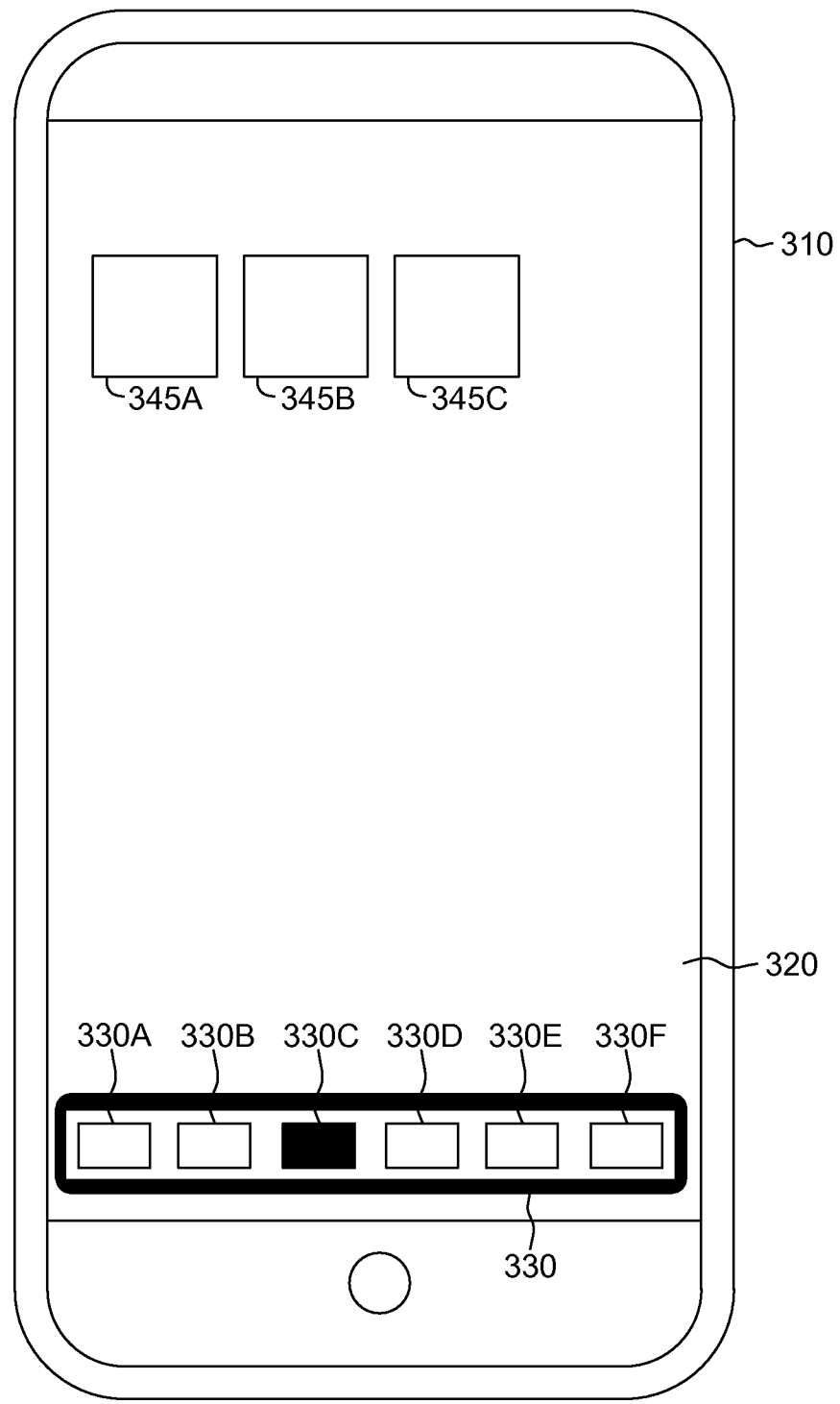

In FIG. 3D, electronic device 310 detects a request to move selected icons 345A-C from queue 140 to display 320. In the example illustrated in FIG. 3D, the detected request includes both moving from the page associated with page indicator 330B to the page associated with page indicator 330C, and moving the icons from the queue to the proximate location in the upper left hand corner where the user made contact with display 320. In response to the request to move selected icons 345A-C, electronic device 310 moves all the icons from queue 140 to the upper left corner of display 320, that is proximate to the user selected location detected by electronic device 310.

The user selects the proximate location the icons are moved to. In an exemplary embodiment all icons in queue 140 are moved to the proximate location selected by the user. For example, if there are more icons in queue 140 than allotted space on the target page, then icons from queue are moved in a user preferred order to the target page, until the target page is filled, then the remaining icons are moved to the next sequential page, until there are no more icons remaining in queue 140. Alternatively, if there are more icons in queue 140 than allotted space on the target page, then icons from queue 140 are moved in a specified order to the target page, until the target page is filled, then the remaining icons remain in queue 140 until the user selects a new target page to move the icons to. In yet another embodiment, only one icon is moved at a time from queue 140 to the proximate location on the target page as selected by the user.

Following all icons being moved from queue 140, the icon rearranging mode is exited, and electronic device 310 returns to normal use. As depicted in FIG. 3D all icons are returned to normal operation mode, as the superimposed graphic 343 of the scissor is no longer present. If the user wishes to move more icons, electronic device 310 will enter icon rearrangement mode upon detection of a request to enter icon rearrangement mode.

Figure 4:
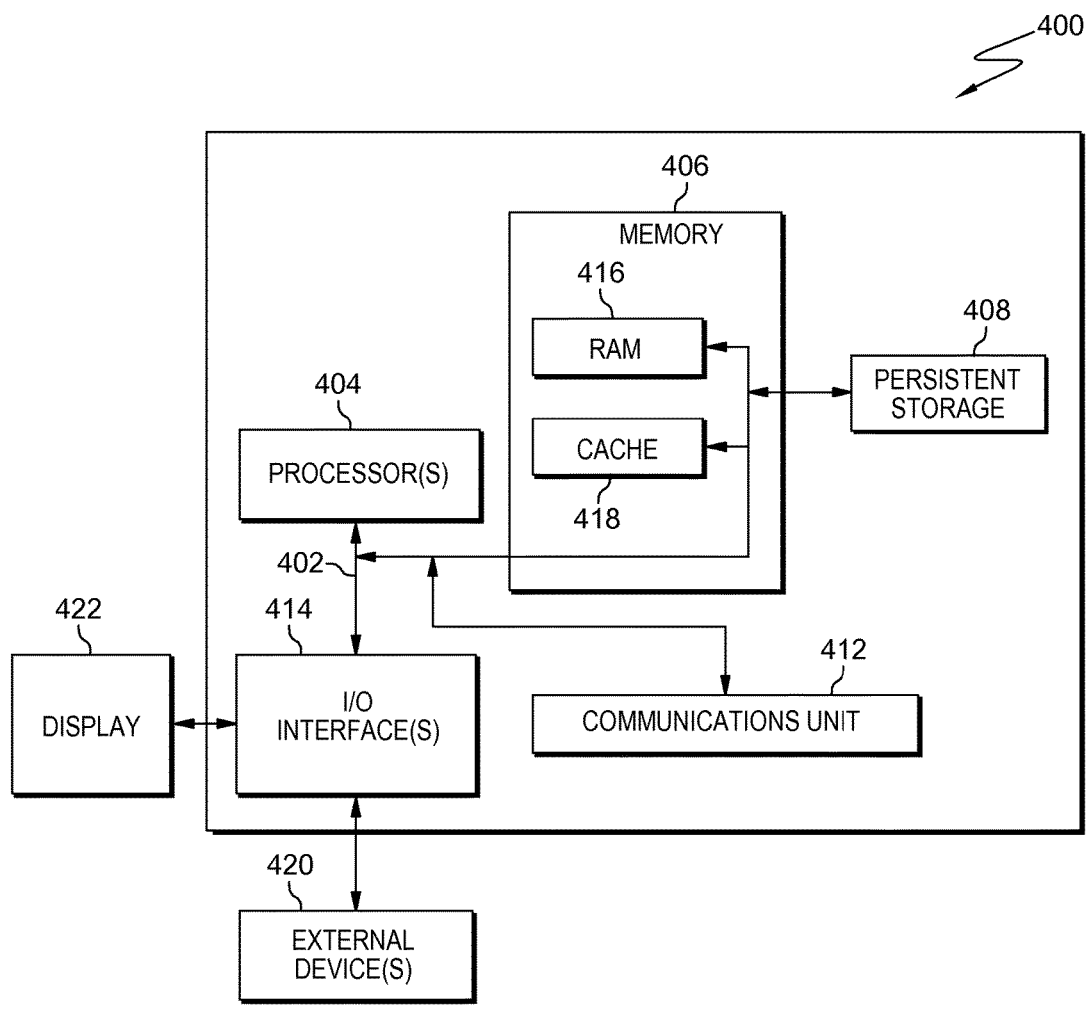
FIG. 4 depicts a block diagram of internal and external components of an electronic device, in accordance with an embodiment of the present invention.

FIG. 4 depicts a block diagram of internal and external components of a device 400, such as the electronic device of FIG. 1, in accordance with an illustrative embodiment of the present invention. It should be appreciated that FIG. 4 provides only an illustration of one implementation, and does not imply any limitations with regard to the environments in which different embodiments may be implemented. Many modifications to the depicted environment may be made.

Device 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media.

Icon rearranging program 130 is stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Icon rearranging program 130 may be downloaded to persistent storage 408 through communications unit 412.

I/O interface(s) 414 allows for input and output of data with other devices that may be connected to device 400. For example, I/O interface 414 may provide a connection to external devices 420, such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for moving one or more icons, comprising:
   receiving, by one or more processors, a selection of at least one icon from a plurality of icons in a graphical user interface (GUI) comprises: a first icon selection from a first page and a second icon selection from a second page;
   moving, by the one or more processors, the selection of the at least one icon to a single queue;
   moving, by the one or more processors, the selection of the at least one icon from the single queue to a target location in the GUI, wherein the target location further comprises: a target page and a position on said target page;

determining, by the one or more processors, whether there are more icons in the single queue than space available on said target page;

responsive to determining there are more icons in the single queue than space available on said target page, creating, by the one or more processors, an additional page until there are no more icons in the single queue than the space available on said target page; and propagating, by the one or more processors, the at least one icon from the single queue to the target location in the GUI within a specified order, wherein the specified order is based on: alphabetical order of the plurality of icons, frequency of the plurality of icons, and chronological order of the plurality of icons.

2. The method of claim 1, wherein receiving the selection of the at least one icon comprises:

detecting a first input;

in response to detecting the first input, initiating a rearranging mode;

displaying a graphic associated with the at least one icon; and determining that the graphic associated with the at least one icon is selected.

3. The method of claim 1, further comprising:

responsive to receiving a selection of a first icon, moving the first icon to the single queue.

4. The method of claim 1, wherein moving the selection of the at least one icon to the single queue comprises:

removing the selection of the at least one icon from the GUI.

5. The method of claim 1, further comprising:

moving a first portion of the selection of the at least one icon to a first position on said target page; and moving a second portion of the selection of the at least one icon to a second position on another target page.

6. The method of claim 1, further comprising:

moving the selection of the at least one icon, from the single queue, to said target page.

7. A computer program product comprising a non-transitory computer readable storage medium and program instructions stored on the non-transitory computer readable storage medium, the program instructions comprising:

program instructions to receive a selection of at least one icon from a plurality of icons in the graphical user interface (GUI);

program instructions to move the selection of the at least one icon to a single queue;

program instructions to move the selection of the at least one icon from the single queue to a target location in the GUI, wherein the target location further comprises: a target page and a position on said target page;

program instructions to determine whether there are more icons in the single queue than space available on said target page;

responsive to determining there are more icons in the single queue than space available on said target page, program instructions to create an additional page until there are no more icons in the single queue than the space available on said target page; and program instructions to propagate the at least one icon from the single queue to the target location in the GUI within a specified order, wherein the specified order is based on: alphabetical order of the plurality of icons, frequency of the plurality of icons, and chronological order of the plurality of icons.

8. The computer program product of claim 7, wherein receiving the selection of the at least one icon comprises:

program instructions to detect a first input;

in response to detecting the first input, program instructions to initiate a rearranging mode;

program instructions to display a graphic associated with the at least one icon; and program instructions to determine that the graphic associated with the at least one icon is selected.

9. The computer program product of claim 7, further comprising:

responsive to receiving a selection of a first icon, program instructions to move the first icon to the single queue.

10. The computer program product of claim 7, wherein moving the selection of the at least one icon to the single queue comprises:

program instructions to remove the selection of the at least one icon from the GUI.

11. The computer program product of claim 7, further comprising:

program instructions to move a first portion of the selection of the at least one icon to a first position on said target page; and program instructions to move a second portion of the selection of the at least one icon to a second position on another target page.

12. The computer program product of claim 7, further comprising:

program instructions to move the single selection of the at least one icon, from said queue, to the target page.

13. A computer system comprising:

one or more computer processors;

one or more computer readable storage media;

program instructions stored on the one or more computer readable storage media for execution by at least one of the one or more processors, the program instructions comprising:

program instructions to receive a selection of at least one icon from a plurality of icons in a graphical user interface (GUI) comprises: a first icon selection from a first page and a second icon selection from a second page;

program instructions to move the selection of the at least one icon to a single queue;

program instructions to move the selection of the at least one icon from the single queue to a target location in the GUI, wherein the target location further comprises: a target page and a position on said target page;

program instructions to determine whether there are more icons in the single queue than space available on said target page;

responsive to determining there are more icons in the single queue than space available on said target page, program instructions to create an additional page until there are no more icons in the single queue than the space available on said target page; and program instructions to propagate the at least one icon from the single queue to the target location in the GUI within a specified order, wherein the specified order is based on: alphabetical order of the plurality of icons, frequency of the plurality of icons, and chronological order of the plurality of icons.

14. The computer system of claim 13, wherein receiving the selection of the at least one icon comprises:

program instructions to detect a first input;

in response to detecting the first input, program instructions to initiate a rearranging mode;

program instructions to display a graphic associated with the at least one icon; and program instructions to determine that the graphic associated with the at least one icon is selected.

15. The computer system of claim 13, further comprising:
responsive to receiving a selection of a first icon, program instructions to move the first icon to the single queue.

16. The computer system of claim 13, wherein moving the selection of the at least one icon to the single queue comprises:
program instructions to remove the selection of the at least one icon from the GUI.

17. The computer system of claim 13, further comprising:
program instructions to move a first portion of the selection of the at least one icon to a first position on said target page; and
program instructions to move a second portion of the selection of the at least one icon to a second position on another target page.

* * * * *